United States Patent
Ye et al.

(10) Patent No.: US 11,263,627 B2
(45) Date of Patent: Mar. 1, 2022

(54) CARD VOUCHER USE SYSTEM, METHOD, DEVICE AND SERVER

(71) Applicant: TENCENT TECHNOLOGY (SHENZHEN) COMPANY LIMITED, Guangdong (CN)

(72) Inventors: Wa Ye, Shenzhen (CN); Jun Zhang, Shenzhen (CN); Yingchao Liu, Shenzhen (CN); Zhenyu Xu, Shenzhen (CN); Yadi Xiao, Shenzhen (CN); Liqiang Wang, Shenzhen (CN); Chengwei Lin, Shenzhen (CN); Kangyi Lin, Shenzhen (CN); Dacheng Zhuo, Shenzhen (CN); Zeqi Lian, Shenzhen (CN); Haixia Rao, Shenzhen (CN); Rui Tang, Shenzhen (CN); Junxian Zhang, Shenzhen (CN); Yong Lin, Shenzhen (CN); Jiandong Lin, Shenzhen (CN); Mengsha Zhou, Shenzhen (CN); Hongyang Wang, Shenzhen (CN); Xin Huang, Shenzhen (CN); Weifeng Zhu, Shenzhen (CN); Zheng Wang, Shenzhen (CN); Cunjin Li, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 402 days.

(21) Appl. No.: 16/194,651

(22) Filed: Nov. 19, 2018

(65) Prior Publication Data
US 2019/0087818 A1    Mar. 21, 2019

Related U.S. Application Data

(63) Continuation of application No. PCT/CN2017/089748, filed on Jun. 23, 2017.

(30) Foreign Application Priority Data

Jul. 14, 2016 (CN) .......................... 201610557094.1

(51) Int. Cl.
| | | |
|---|---|---|
| G06Q 20/38 | (2012.01) | |
| G06Q 20/32 | (2012.01) | |
| G06Q 20/34 | (2012.01) | |

(52) U.S. Cl.
CPC ....... *G06Q 20/387* (2013.01); *G06Q 20/3276* (2013.01); *G06Q 20/351* (2013.01); *G06Q 20/38* (2013.01)

(58) Field of Classification Search
CPC .............................. G06Q 20/10; G06Q 40/00
See application file for complete search history.

(56) References Cited

U.S. PATENT DOCUMENTS

| | | | | |
|---|---|---|---|---|
| 2011/0137742 A1* | 6/2011 | Parikh | ................ | G06Q 30/0635 705/26.1 |
| 2012/0004968 A1* | 1/2012 | Satyavolu | ............ | G06Q 20/387 705/14.17 |

(Continued)

FOREIGN PATENT DOCUMENTS

| | | |
|---|---|---|
| CN | 103930915 A | 7/2014 |
| CN | 105303400 A | 2/2016 |

(Continued)

OTHER PUBLICATIONS

International Search Report of PCT/CN2017/089748 dated Sep. 20, 2017 [PCT/ISA/210].

*Primary Examiner* — Bennett M Sigmond
*Assistant Examiner* — Marla Hudson
(74) *Attorney, Agent, or Firm* — Sughrue Mion, PLLC

(57) ABSTRACT

A card use system includes a first client configured to send a card use request including card information of a card, and display a payment code including a first resource account number corresponding to the first client; a second client configured to send a payment request to transfer a first quantity of resources from the first resource account number to a second resource account number corresponding to the (Continued)

second client; a card server configured to validate the card according to the card information; and in response to successfully validating the card, send a confirmation indication to the payment server; and a payment server configured to, in response to receiving the confirmation indication from the card server, transfer a second quantity of resources in the first resource account number corresponding to the first client to the second resource account number corresponding to the second client.

16 Claims, 9 Drawing Sheets

(56) References Cited

U.S. PATENT DOCUMENTS

| | | | |
|---|---|---|---|
| 2012/0209749 A1* | 8/2012 | Hammad | G06Q 20/204 705/27.1 |
| 2013/0026232 A1* | 1/2013 | Zhou | G06Q 20/3821 235/380 |
| 2013/0030895 A1* | 1/2013 | Eichstaedt | G06Q 30/0257 705/14.22 |
| 2014/0249903 A1 | 9/2014 | Preston | |
| 2014/0330713 A1* | 11/2014 | Isaacson | G06Q 20/24 705/41 |
| 2015/0106183 A1* | 4/2015 | McEvilly | H04W 4/025 705/14.25 |
| 2015/0193774 A1* | 7/2015 | Wetzel | G06Q 50/01 705/44 |
| 2015/0371215 A1* | 12/2015 | Zhou | G06F 3/041 705/71 |

FOREIGN PATENT DOCUMENTS

| | | |
|---|---|---|
| CN | 105608606 A | 5/2016 |
| CN | 106204041 A | 12/2016 |

\* cited by examiner

CARD VOUCHER USE SYSTEM, METHOD, DEVICE AND SERVER

CROSS REFERENCE TO RELATED PATENT APPLICATIONS

This application is a continuation of International Application No. PCT/CN2017/089748, filed on Jun. 23, 2017, which claims priority from Chinese Patent Application No. 201610557094.1, filed with the Chinese Patent Office on Jul. 14, 2016 and entitled "card use system, method, and apparatus, and server", the disclosures of which are incorporated herein by reference in their entireties.

BACKGROUND

1. Field

The present disclosure generally relates to data processing, and more specifically relates to an electronic card use system, method, device and server.

2. Description of the Related Art

With development of Internet technology and mobile terminal technology, an increasing quantity of merchants issue paper cards or electronic cards to users using the Internet.

When a user uses a card to purchase from a specified merchant, the user presents the card to a shop assistant, the shop assistant obtains a unique sequence number of the card in a manner, such as, scanning a payment quick response code, and validates the card according to the obtained unique sequence number. If the card is successfully validated, the shop assistant calculates an actual payment amount according to a concession amount indicated by the card and an actual purchase amount of the user, and completes the payment by scanning the payment quick response code.

However, in order to make a payment using a card, the user of the card needs to present the card and the payment quick response code each time the user wishes to make a payment, resulting in a payment process that is cumbersome and inefficient for the user.

SUMMARY

According to certain aspects of the present disclosure, a card use system, method, apparatus and non-transitory computer storage medium are provided.

According to an aspect of an exemplary embodiment, provided is a card use system including: a first client, a second client, a card server, and a payment server, the first client being configured to, in response to receiving a card use trigger signal, send a card use request to the card server, the card use request including card information of a card, and display a payment code, the payment code including a first resource account number corresponding to the first client; the second client being configured to obtain the payment code displayed by the first client, and send a payment request to the payment server according to the obtained payment code, the payment request being a request to transfer a first quantity of resources from the first resource account number corresponding to the first client to a second resource account number corresponding to the second client; the card server being configured to validate the card according to the card information, and in response to successfully validating the card, send a confirmation indication to the payment server, the confirmation indication including a resource deduction quantity corresponding to the card; and the payment server being configured to, in response to receiving the confirmation indication from the card server, calculate a second quantity of resources based on the first quantity of resources and the resource deduction quantity, and transfer the second quantity of resources in the first resource account number corresponding to the first client to the second resource account number corresponding to the second client.

The card may be a card shared with a social platform by a third client having a predetermined social relationship with the first client, and the card can be used once, the card server may associate the card with the first client according to a client identifier of the first client in the card use request, and lock the card, wherein the locked card cannot be associated with a different client, the payment server may obtain the client identifier of the first client and that is included in the payment request, and send an inquiry request to the card server according to the client identifier, the inquiry request inquiring whether there is a card associated with the first client, and the card server may, in response to detecting that there is the card associated with the first client, validate the card according to the card information.

The card server may cancel the card, delete an association relationship between the card and the first client, and send a cancellation indication to the social platform, wherein the social platform is configured to cancel the card according to the cancellation indication.

The payment server may send payment completion information to the first client and the second client after completing the resource transfer, wherein the payment completion information includes at least one of the first quantity of resources, the resource deduction quantity, or the second quantity of resources.

The second client may send a card delivery request to the card server, after the resource transfer is completed, requesting delivery of the card to the first client; the card server may deliver the card to the first client according to the card delivery request; and the first client may share the card with the social platform.

According to an aspect of another exemplary embodiment, provided is a card use method including: receiving a card use request sent by a first client, the card use request including card information of a card; validating the card according to the card information; and in response to successfully validating the card, sending a confirmation indication to a payment server, the confirmation indication including a resource deduction quantity corresponding to the card, wherein the payment server is configured to, in response to receiving the confirmation indication, calculate a second quantity of resources based on a first quantity of resources and the resource deduction quantity and transfer the second quantity of resources in a first resource account number corresponding to the first client to a second resource account number corresponding to a second client, and wherein the first quantity is sent by the second client to the payment server upon obtaining payment code displayed by the first client, the payment code including the first resource account number.

The card may be a card shared with a social platform by a third client having a predetermined social relationship with the first client, and the card can be used once, and the method may further include: associating the card with the first client according to a client identifier of the first client in the card use request; locking the card, wherein the locked card cannot be associated with another client; and receiving an inquiry request sent by the payment server inquiring whether there is a card associated with the first client; and in response to the inquiry request indicating that there is the card associated with the first client, validating the card according to the card information.

The method may further include, in response to sending a confirmation indication to the payment server, cancelling the card, deleting an association relationship between the card and the first client, and sending a cancellation indication to the social platform, wherein the social platform is configured to cancel the card according to the cancellation indication.

The method may further include, in response to sending a confirmation indication to the payment server, receiving a card delivery request sent by the second client, wherein the card delivery request is used for requesting to deliver the card to the first client; and delivering the card to the first client according to the card delivery request, wherein the first client is configured to share the card with the social platform.

According to an aspect of still another exemplary embodiment, provided is a card use method including: receiving, from a second client, a payment request to transfer a first quantity of resources in a first resource account number corresponding to a first client to a second resource account number corresponding to a second client; receiving, from a card server, a confirmation indication that includes a resource deduction quantity corresponding to a card, wherein the confirmation indication is received from the card server, in response to the card server validating card information included in a card use request received by the card server from the first client; calculating a second quantity of resources based on the first quantity of resources and the resource deduction quantity; and transferring the second quantity of resources in the first resource account number corresponding to the first client to the second resource account number corresponding to the second client, wherein the payment request is transmitted by the second client to the first client in response to obtaining payment code displayed by the first client, and the payment code is displayed by the first client in response to receiving a card use trigger signal, and includes the first resource account number corresponding to the first client.

The card may be shared with a social platform by a third client having a predetermined social relationship with the first client, and the card can be used once, and the method further includes: obtaining, from the payment request, a client identifier of the first client; and sending an inquiry request to the card server according to the obtained client identifier of the first client, to determine whether there is a card associated with the first client, wherein the card server is configured to, in response to determining that there is the card associated with the first client, validate the card, and associate the card with the first client according to a client identifier of the first client in the card use request, and lock the card, wherein the locked card cannot be associated with another client.

The method may further include, in response to transferring the second quantity of resources in the first resources account number corresponding to the first client to the second resource account number corresponding to the second client, sending payment completion information to the first client and the second client, wherein the payment completion information includes at least one of the first quantity of resources, the resource deduction quantity, and the second quantity of resources.

According to an aspect of still another exemplary embodiment, provided is a card use apparatus including: at least one memory configured to store computer program code; and at least one processor configured to access said at least one memory and operate according to said computer code, said program code configured to cause the at least one of said at least one processor to receive a card use request from a first client, the card use request including card information of a card; validate the card according to the card information of the card included in the received card use request; and in response to successful validation of the card, send a confirmation indication to a payment server, the confirmation indication including a resource deduction quantity corresponding to the card, wherein the payment server is configured to: in response to receiving the confirmation indication, calculate a second quantity according to a first quantity and the resource deduction quantity, and transfer the second quantity of resources in a first resource account number corresponding to the first client to a second resource account number corresponding to a second client, and wherein the first quantity is transmitted by the second client to the payment server in response to obtaining a payment code displayed by the first client, and including the first resource account number.

The card may be a card shared with a social platform by a third client having a predetermined social relationship with the first client, and the card can be used once, and said program code is further configured to cause the at least one of said at least one processor to: associate the card with the first client according to a client identifier of the first client in the card use request; lock the card, wherein the locked card cannot be associated with another client; receive an inquiry request sent by the payment server requesting a determination of whether there is a card associated with the first client; and in response to determining that there is the card associated with the first client, validate the card according to the card information.

The program code may cause the at least one of said at least one processor to: cancel the card, and delete an association relationship between the card and the first client; and send a cancellation indication to the social platform, wherein the social platform is configured to cancel the card according to the cancellation indication.

The program code may cause the at least one of said at least one processor to: receive a card delivery request from the second client to deliver the card to the first client; and deliver the card to the first client according to the card delivery request, wherein the first client is configured to share the delivered card with the social platform.

According to an aspect of still another exemplary embodiment, provided is a card use apparatus, the apparatus including: at least one memory configured to store computer program code; and at least one processor configured to access said at least one memory and operate according to said computer code, said program code configured to cause the at least one of said at least one processor to: receive a payment request from a second client, requesting transfer of a first quantity of resources in a first resource account number corresponding to a first client to a second resource account number corresponding to the second client, wherein the payment request includes a payment code obtained by the second client from the first client and the payment code includes a first resource account number corresponding to the first client; receive a confirmation indication, including a resource deduction quantity corresponding to a card, from a card server, in response to the card server validating card information in a card use request received by the card server from the first client; calculate a second quantity based on the first quantity of resources and the resource deduction quantity; and transfer the second quantity of resources in the first resource account number corresponding to the first client to the second resource account number corresponding to the second client.

The card may be a card shared with a social platform by a third client having a predetermined social relationship with the first client, and the card can be used once, and wherein said program code is further configured to cause the at least one of said at least one processor to: obtain a client identifier of the first client and included in the payment request; and send an inquiry request to the card server according to the client identifier of the first client, inquiring whether there is a card associated with the first client, and the card server is configured to validate the card in response to determining that there is the card associated with the first client, wherein the card server is further configured to: associate the card with the first client according to a client identifier of the first client in the card use request, and lock the card, wherein the locked card cannot be associated with another client.

The program code may cause the at least one of said at least one processor to: send payment completion information to the first client and the second client, wherein the payment completion information includes at least one of the first quantity, the resource deduction quantity, or the second quantity.

BRIEF DESCRIPTION OF THE DRAWINGS

The accompanying drawings, which are included to provide further understanding and are incorporated and constitute a part of this specification, illustrate disclosed embodiments and together with the description serve to explain the principles of the disclosed embodiments. In the drawings.

DETAILED DESCRIPTION

Figure 1:
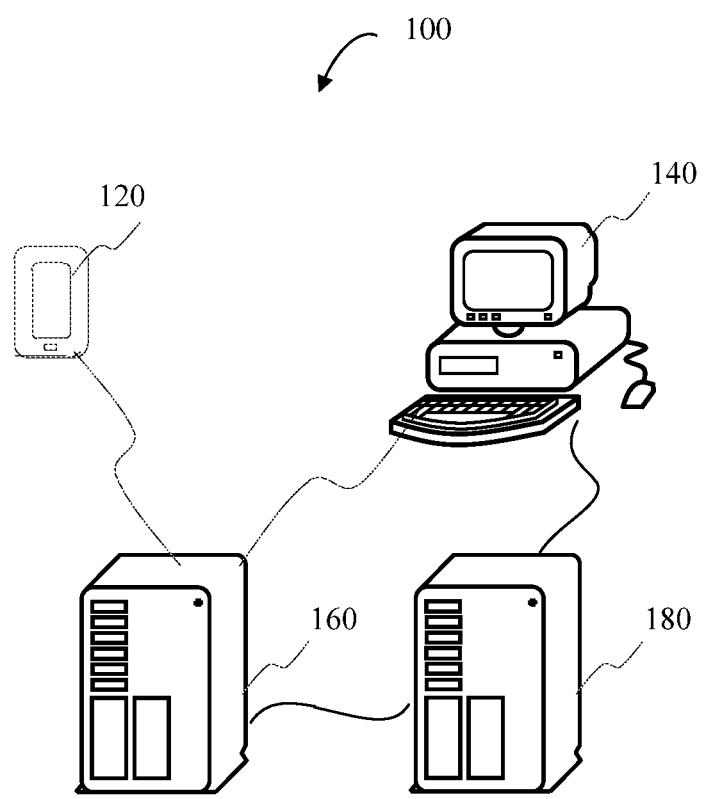
FIG. 1 is a block diagram of a card use system according to an example embodiment.

To make the objectives, technical solutions, and advantages of the present disclosure clearer, the following further describes implementations of the present disclosure in detail with reference to the accompanying drawings.

It should be noted that, "multiple" mentioned in this specification means two or more than two. The "and/or" in this specification describes an association relationship for describing associated objects and represents that three relationships may exist. For example, A and/or B may represent the following three cases: Only A exists, both A and B exist, and only B exists. The character "/" generally indicates an "or" relationship between the associated objects.

For easy understanding, the following explains terms provided in embodiments according to certain aspects of the present disclosure.

Card: a voucher that is issued by a merchant and that is used for obtaining a corresponding service from the merchant. Card types include but are not limited to: a cash coupon, a discount coupon, a gift voucher, a group purchase coupon, a universal coupon, a movie ticket, an air ticket, a car ticket, a scenic spot entrance ticket, a conference entrance ticket, a membership card without a value storage function, a membership card with a value storage function, and the like. The cash coupon is a coupon that can be used instead of cash to obtain a service, such as a 10 renminbi (RMB) cash coupon. The discount coupon is a coupon that enables a service to be qualified for a discount when the service is obtained, such as a 10% discount coupon. The gift voucher is a coupon that is presented as a gift and that can be directly converted into cash or used as cash to obtain a service, such as an olive oil gift voucher. The group purchase coupon is a coupon obtained in a group purchase manner in a group purchase website or a group purchase application. The universal coupon is a coupon that can be universally used in all categories or a service range of a platform. A card is generally an electronic card, and may be printed as a paper card according to a customer requirement. The cards used in embodiments according to certain aspects of the present disclosure may be electronic cards.

Card information: including a unique sequence number of a card, a reduction amount corresponding to the card, a service life requirement of the card, a use location requirement of the card, and the like. The reduction amount may be used in a form of cash reduction for an amount spent (for example, a 50 RMB reduction for 100 RMB spent) or discount (for example, a 10% discount). Schematically, card information of a card issued by the XX coffee shop may be shown in Table 1.

TABLE 1

| Card code | Reduction amount | Service life | Use location |
|---|---|---|---|
| A1234567898 | 20 RMB reduction for 100 RMB spent | 2016.7.5-2016.7.31 | XX coffee Chaoyang shop |

Beneficial effects of the technical solutions provided according to certain aspects of the disclosure include:

A first client sends a card use request to a card server, and displays payment code, and a second client obtains the payment code and sends a payment request to a payment server; the card server validates a card according to card information included in the card use request, and after the card is successfully validated, sends a resource deduction quantity corresponding to the card to the payment server, so that the payment server calculates, according to a first quantity in the payment request and the resource deduction quantity, a quantity of resources actually transferred, thereby completing resource transfer between the first client and the second client, resolving a problem that, in a process of using a card, a user needs to successively show the card and payment quick response code, and consequently a use process is complex and payment efficiency is relatively low. Therefore, by using a data exchange channel between the card server and the payment server, card information transmission is performed, and a card validation and payment procedure is completed, so that in the process of using the card, the user does not need to show the card, and needs only to show payment code, thereby simplifying a card use procedure, and increasing payment efficiency.

FIG. 1 is a block diagram of a card use system 100 according to an example embodiment. The card use system 100 includes a first terminal 120, a second terminal 140, a card server 160, and a payment server 180.

The first terminal 120 is a terminal used by a user. The first terminal 120 may be a mobile phone, a tablet computer, an e-book reader, a moving picture experts group audio layer III (MP3) player, a moving picture experts group audio layer IV (MP4) player, a portable laptop computer, a desktop computer, or the like. The first terminal 120 may be running a first client that is installed on the first terminal 120. The first client may be an application or program that provides various functionality, such as, card receiving, card holding, and card use, for example, a communications client having an electronic card function, a wallet-type client having an electronic card function, a comment-type client having an electronic card function, a social client having an electronic card function, or a special card packet client. These types of clients may be referred to as "card applications".

The second terminal 140 is a terminal used by a merchant. The second terminal 120 may be a carrier branded smartphone, a mobile phone, a tablet computer, a portable laptop computer, a desktop computer, or the like of a merchant. The second terminal 140 may be running a second client that is installed on the second terminal 140. The second client may be a program or an application that provides various functionality, such as, card fabrication, card launch, card cancellation, and card management. In some embodiments, the first and second client may be an application program client or a web page client.

In some embodiments, the second terminal 140 scans quick response code and parses data in the quick response code.

In some embodiments, the first terminal 120 is connected to the card server 160 by a wired or wireless network, and the second terminal 140 is connected to the card server 160 by a wired or wireless network.

The card server 160 may be a background server configured to manage an electronic card. In some embodiments, the card server 160 may be established by the merchant; or may be accessed by the merchant after being established by a platform service provider of the electronic card. In some embodiments, the card server 160 is established by a public platform. For example, in some embodiments, the card server 160 may be established by a WeChat public platform of Tencent Inc. of China, and when a merchant accesses the WeChat public platform using an official account, the merchant may use electronic card functionality provided by the WeChat public platform.

A public platform refers to a network architecture that connects one person to another person, a person to an organization, or a person to a thing by using social relationships and/or common interests. A user may perform daily communication and process daily transactions by using a client provided by the public platform. Each user of the public platform may have a network identity enabling that user to be identified by another user on the public platform.

A user or an organization may establish a public social network identifier (an official account) on the public platform, and allow the public (for example, any user on the public platform) to communicate with the public social network identifier on the public platform, where the communication may be based on a manner of one-way confirmation, without a need of mutual confirmation between users. For example, a user may choose to subscribe to a public social network identifier (for example, "follow" a public social network identity) message or release information, and become a social network contact person of the public social network identifier in the manner of one-way confirmation such as subscription. An owner of a public social network identity may further use another user as a social network contact of the owner, where the another user is a user who has subscribed to a message of the owner or releases information.

Each user and each public social network identifier on the public platform have a social network contact person list, so that the user and the public social network identifier communicate with a user or a public social network identifier included in the social network contact person list, for example, using instant communication messaging. For example, users in a social group may communicate with each other by using an interface provided by the public platform, and users may also communicate with each other by using an interface provided by the public platform.

In some embodiments, the card server 160 is connected to the payment server 180 by a wired or wireless network.

The payment server 180 is a background server configured to perform resource management and resource transfer. In some embodiments, both the first client and the second client register resource account numbers in the payment server 180, and the payment server 180 may perform resource transfer between the registered resource account numbers. A transferred resource may be cash, accumulated points, a gold or silver ingot, a gold bean, or another virtual currency.

In some embodiments, the wireless network or wired network uses a standard communications technology and/or protocol. The network is generally the Internet, or may be any network, including but not limited to any combination of a local area network (LAN), a metropolitan area network (MAN), a wide area network (WAN), a mobile, wired, or wireless network, a dedicated network, or a virtual dedicated network. In some embodiments, data exchanged by using the network is represented by using a technology and/or format such as Hyper Text Mark-up Language (HTML) or Extensible Markup Language (XML). In addition, all or some links may be further encrypted by using a regular encryption technology such as secure socket layer (SSL), transport layer security (TLS), virtual private network (VPN), or Internet Protocol security (IPsec). In some other embodiments, the foregoing data communications technology may be further replaced or compensated with a customized and/or dedicated data communications technology.

In a related technology, when a user uses a card in the first client, the first client displays a unique code (for example, quick response code or barcode) of the card. A shop assistant obtains the unique code by using the second client (for example, scanning the quick response code), and sends the unique code to the card server, and the card server validates the card. If the card is successfully validated, the card server returns an indication of successful validation to the second client. After receiving the indication of successful validation, the shop assistant calculates an actual payment amount according to an actual consumption (purchase) amount of the user and a reduction amount indicated by the card, and sends a money deduction to the payment server by scanning payment code shown by the user (the second client), to instruct to transfer a specified amount (an actual payment amount) of cash in an account corresponding to the first client to an account corresponding to the second client.

According to known card use techniques, the card validation process is relatively isolated from the payment process. That is, no data is exchanged between the card server and the payment server, and consequently the user needs to repeatedly present the card and the payment code, thereby severely affecting card use efficiency. However, embodiments according certain aspects of the present disclosure combine the card validation process and the payment process, thereby increasing the card use efficiency.

Figure 2:
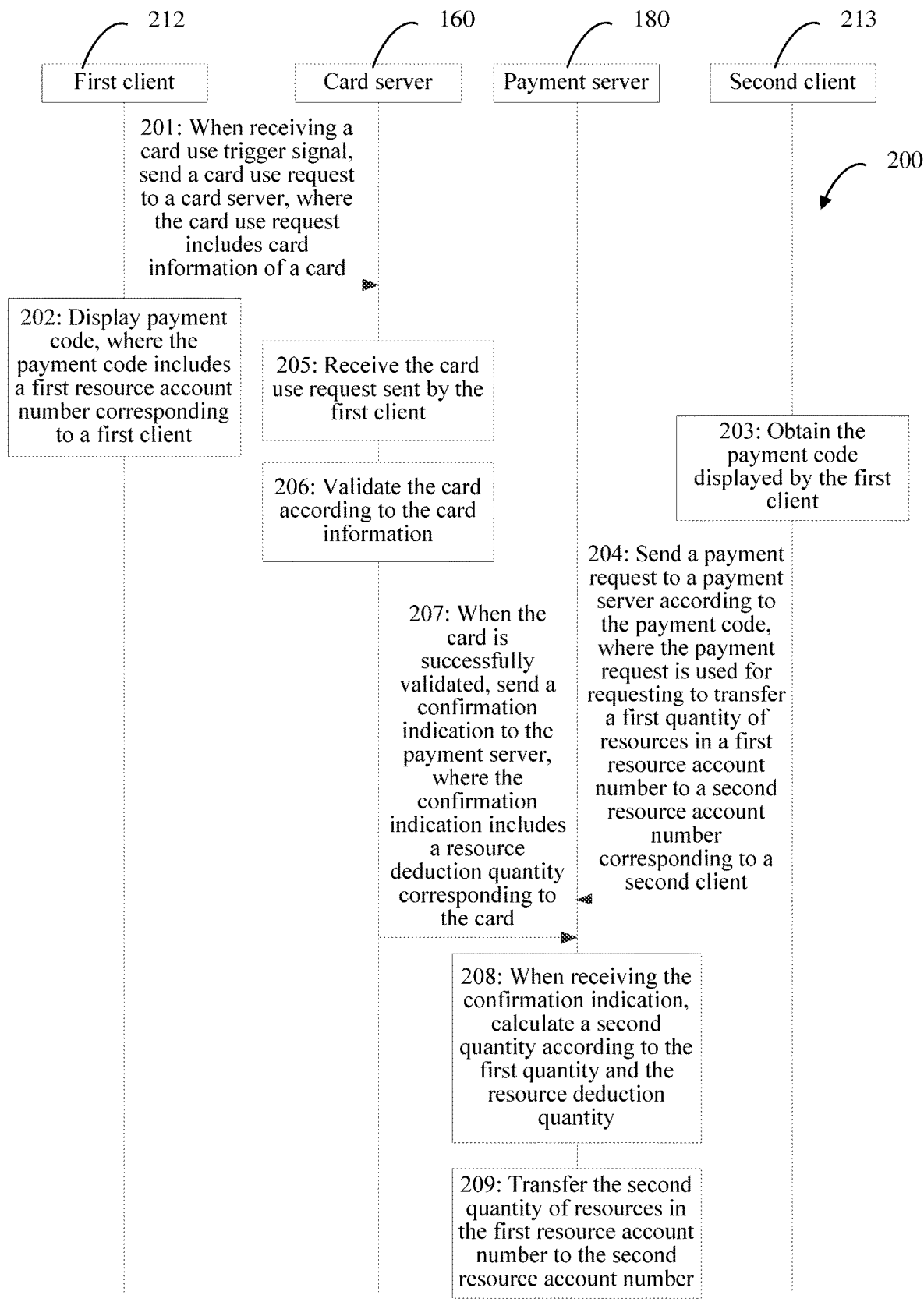
FIG. 2 is a flowchart of a card use method according to an example embodiment.

FIG. 2 is a flowchart of a card use method 200 according to an example embodiment. The card use method 200 shown in FIG. 2 may be implemented using the card use system 100 shown in FIG. 1. The method 200 includes the following:

Step 201: In response to receiving a card use trigger signal, a first client 212 running on a first terminal, such as the first terminal 120 shown in FIG. 1, sends a card use request to a card server, such as the card server 160 in FIG. 1, where the card use request includes card information of a card.

In some embodiments, the first client 212 may include functionality for card receiving, card holding, and card use. Cards received by a user may be held together in a "card packet". When needing to use a card, the user may check the held cards, and select the corresponding card to use.

In some embodiments, the first client 212 displays held cards in a list form, and jumps to display details about a card when receiving a card selection signal. When displaying the details about the card, the first client 212 provides a card use entry, and receives a card use trigger signal by using the use entry.

According to known techniques, when a user clicks a card to use, the first client needs to display quick response code (or barcode) of the card, for the second client to validate. In contrast, according to the example method shown in FIG. 2, in response to receiving the card use trigger signal, the first client 212 does not need to display the quick response code of the card, and instead sends a card use request carrying the card information to the card server 160. The card information may provide a unique code of the card, a deduction amount, a service life requirement of the card, a use location requirement of the card, and the like.

Figure 3:
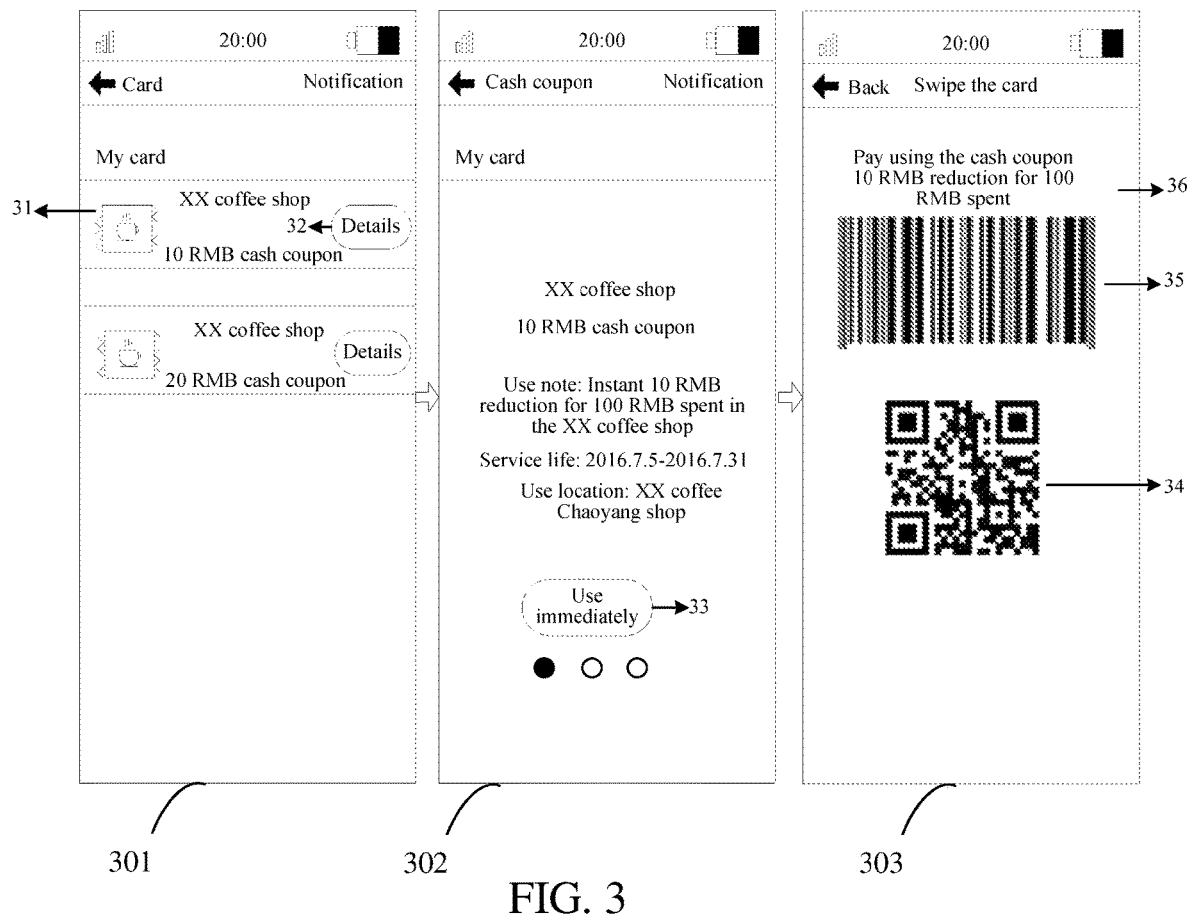
FIG. 3 is an example illustration associated with the card use method shown in FIG. 2.

FIG. 3 shows a first screenshot 301, a second screenshot 302 and a third screenshot 303 of a display of the first terminal 120 running the first client 212. For example, as shown in FIG. 3, the first client 212 displays, as shown in the first screenshot 301, a card 31 in a list form, and displays, as shown in the first screenshot 301, a button 32 at a location corresponding to the card 31. When the user clicks the button 32, the first client 212 jumps to display, as shown in the second screenshot 302, details about the card 31. In addition, the first client 212 provides a use entry (a button 33) of the card 31, and when the user clicks the button 33, the first client 212 receives a card use trigger signal, and sends a card use request to the card server 160.

It should be noted that, the card use request sent by the first client 212 to the card server 160 further carries a client identifier of the first client 212, so that the card server 160 can distinguish between the senders corresponding to different card use requests.

Step 202: The first client 212 displays, as shown in the third screenshot 303, a payment code, where the payment code includes a first resource account number corresponding to the first client 212.

When sending the card use request to the card server 160, the first client 212 displays, as shown in the screenshot 303, the payment code including the first resource account number corresponding to the first client 212. The payment code may be presented, without limitation, in a form of quick response code or barcode.

For example, as shown in FIG. 3, when receiving the card use trigger signal, the first client 212 displays a payment page, as shown in the third screenshot 303. To adapt to code scanning guns (devices that may be used by the second client 213 for obtaining the payment code) of different model numbers, the payment page, as shown in the third screenshot 303, includes the payment code represented by both using quick response code 34 and by using barcode 35. In addition, the displayed payment page further includes a deduction amount 36 of the card.

Step 203: A second client 213 obtains the payment code displayed, as shown in the third screenshot 303, by the first client 212.

The second client 213 may obtain the payment code displayed by the first client 212 by using a code scanning device. For example, the code scanning device may be a code scanning gun connected to a second terminal 140, (on which the second client 213 is installed), or the code scanning device may be a camera of the second terminal 140.

Step 204: The second client 213 sends a payment request to a payment server 180 according to the obtained payment code, where the payment request is used for requesting to transfer a first quantity of resources in a first resource account number corresponding to the first client 212 to a second resource account number corresponding to the second client 213.

After obtaining the payment code displayed by the first client 212, the second client 213 parses the first resource account number corresponding to the first client 212 that is included in the obtained payment code. For example, the second client 213 obtains payment quick response code displayed by the first client 212, and extracts, by using a quick response code parsing function, a first resource account number corresponding to the first client 212 that is included in the payment quick response code.

Before (or after) obtaining the payment code displayed by the first client 212, the second client 213 receives an actual consumption (purchase) amount (a first quantity of resources) recorded by a shop assistant, and sends the payment request to the payment server 180 according to the first resource account number corresponding to the first client 212, the second resource account number corresponding to the second client 213, and the actual consumption amount.

For example, the second client 213 generates a payment request according to a first resource account number KH1234 corresponding to the first client 212, a second resource account number SH1203 corresponding to the second client 213, and an actual consumption amount 105 RMB, and sends the generated payment request to the payment server 180, to instruct the payment server 180 to transfer 105 RMB from the first resource account number KH1234 corresponding to the first client 212 to the second resource account number SH1203 corresponding to the second client 213.

Step 205: The card server 160 receives the card use request sent by the first client 212.

In step 201, the first client 212 sends the card use request to the card server 160, and correspondingly the card server 160 receives the card use request, and obtains card information carried in the card use request.

For example, the card information that is included in the card use request and that is obtained by the card server 160 is shown in the foregoing Table 1.

Step 206: The card server 160 validates the card according to the card information.

A card issued by a merchant has a limitation when being used, and therefore the card server 160 further validates the card according to the card information.

In some embodiments, the card server 160 obtains unique code in the card information, and checks whether a pre-stored card library includes an unused card consistent with the unique cod, and if the pre-stored card library includes the unused card, determines that the card is successfully validated.

In some embodiments, the card server 160 obtains a card service life in the card information, detects whether a current moment falls within the card service life, and if the current moment falls within the card service life, determines that the card is successfully validated.

In some embodiments, the card server 160 obtains a card use location in the card information, detects whether a current geographical location of the first client 212 (or the second client 213) belongs to the card use location, and if the current geographical location of the first client 212 (or the second client 213) belongs to the card use location, determines that the card is successfully validated.

It should be noted that, the example embodiment discussed above only schematically describes the foregoing card validation manners, but does not limit this disclosure.

Step 207: When the card is successfully validated, the card server 160 sends a confirmation indication to the payment server 180, where the confirmation indication includes a resource deduction quantity corresponding to the card.

In a related technology, when the card is successfully validated, the card server feeds back a validation success indication to the second client, so that the second client further calculates an actual payment amount according to a reduction amount indicated by the card, thereby sending the payment request to the payment server according to the actual payment amount. In an entire process, communication is performed only between the second client and the card server and between the second client and the payment server, and communication is not performed between the card server and the payment server. In embodiments according to the present disclosure, when the card is successfully validated, the card server communicates with the payment server, to notify the payment server of the deduction amount of the card, and instruct the payment server to complete the resource transfer according to the actual consumption amount and the deduction amount. The card server may send a resource deduction quantity (the deduction amount) of the card to the payment server in a manner of sending a determining indication.

Referring back to the example card use method of FIG. 2, it should be noted that, when the card is not successfully validated, the card server 160 may send a corresponding indication to the first client 212, to notify the first client 212 that the card is not successfully validated. Details are not described herein.

Step 208: When receiving the confirmation indication, the payment server 180 calculates a second quantity according to the first quantity and the resource deduction quantity.

After receiving the confirmation indication, the payment server 180 obtains the resource deduction quantity (the deduction amount) carried in the confirmation indication, and calculates the second quantity (the actual payment amount) according to the resource deduction quantity and the first quantity (the actual consumption amount) included in the payment request, where the second quantity=the first quantity−the resource deduction quantity.

For example, if the first quantity included in the payment request that is sent by the second client 213 and that is received by the payment server 180 is 105 RMB, and the resource deduction quantity included in the confirmation indication that is sent by the card server and that is received by the payment server 180 is 10 RMB, the second quantity obtained through calculation is 105−10=95 RMB.

It should be noted that, in some embodiments, when the resource deduction quantity is a discount, the second quantity=the first quantity*the resource deduction quantity. This is not limited in this embodiment.

In some embodiments, before calculating the second quantity according to the first quantity and the resource deduction quantity, the payment server 180 detects whether the first quantity meets a deduction requirement corresponding to the resource deduction quantity, and if the first quantity meets the deduction requirement, the payment server 180 calculates the second quantity; or if the first quantity does not meet the deduction requirement, the payment server 180 sends deduction failure information to the card server, the first client 212 and/or the second client 213.

For example, when the deduction requirement corresponding to the resource deduction quantity is "a 20 RMB reduction for 100 RMB spent", the payment server 180 detects whether the first quantity is greater than 100, and when the first quantity is greater than 100 RMB, calculates the second quantity as (the first quantity—20 RMB).

Step 209: The payment server 180 transfers the second quantity of resources in the first resource account number of the first client 212 to the second resource account number of the second client 213.

After calculating the second quantity, the payment server 180 transfers the second quantity of resources from the first resource account number to the second resource account number according to the first resource account number of the first client 212 and the second resource account number of the second client 213 that are in the payment request.

In some embodiments, after completing the resource transfer, the payment server 180 sends a cancellation indication to the card server 160, so that the card server 160 cancels the used card.

In some embodiments, the payment server 180 sends payment completion information to the first client 212 and/or the second client 213 after completing the resource transfer, where the payment completion information includes at least one of the first quantity, the resource deduction quantity, or the second quantity.

In summary, a first client sends a card use request to a card server, and displays payment code, and a second client obtains the payment code and sends a payment request to a payment server; the card server validates a card according to card information included in the card use request, and after the card is successfully validated, sends a resource deduction quantity corresponding to the card to the payment server, so that the payment server calculates, according to a first quantity in the payment request and the resource deduction quantity, a quantity of resources actually transferred, thereby completing resource transfer between the first client and the second client, resolving a problem that, in a process of using a card, a user needs to successively show the card and payment quick response code, and consequently a use process is complex and payment efficiency is relatively low. Therefore, by using a data exchange channel between the card server and the payment server, card information transmission is performed, and a card validation and payment procedure is completed, so that in the process of using the card, the user does not need to show the card, and needs only to show payment code, thereby simplifying a card use procedure, and increasing payment efficiency.

In the example method shown in FIG. 2, the user uses a card that has been received and held in a card packet of the first client 212. In another embodiment, the card may be a card shared with a social platform by a third client that has a predetermined social relationship with the first client 212. The predetermined social relationship may refer to a mutual friend relationship, being in a same group, mutual following, one-way following, or the like. In such embodiments, this type of card is referred to as a "friend coupon".

In some embodiments, a client may be a WeChat client of Tencent Inc. of China. After obtaining a card, a WeChat client A (corresponding to a user A) may share the card with a WeChat platform, and the WeChat platform may spread the card to a WeChat client B and a WeChat client C that have a friend relationship (a predetermined social relationship) with the WeChat client A. Correspondingly, a user using the WeChat client B and the WeChat client C may view the card in the friend coupon, and use the card.

To prevent a plurality of clients from using a same friend coupon at a same moment, thereby causing a problem of repeated use of a card, in some embodiments according to the present disclosure, the card server locks the card when receiving a card use request, thereby preventing a same card from being simultaneously used by a plurality of clients.

Figure 4:
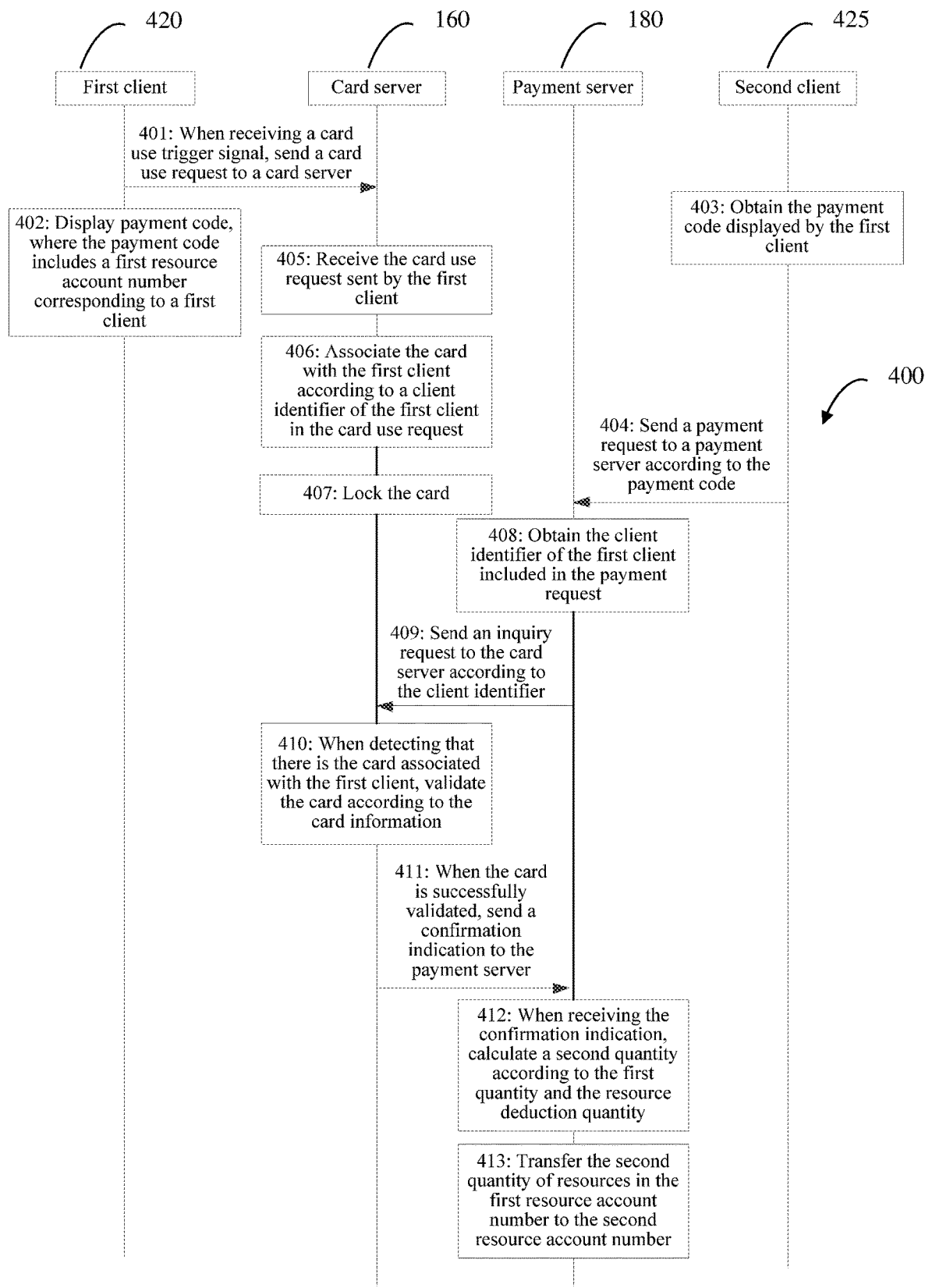
FIG. 4 is a flowchart of a card use method according to another example embodiment.

FIG. 4 is a flowchart of an example card use method 400 according to certain aspects of the present disclosure. The example method 400 in FIG. 4 may be implemented using the example system shown in FIG. 1. A first client 420 may be installed on the first terminal 120 and a second client 425 may be installed on the second terminal 140. The method 400 shown in FIG. 4 includes the following steps:

Step 401: When receiving a card use trigger signal, the first client 420 sends a card use request to a card server 160, where the card use request includes card information of a card.

A user not only may view a received card in a card packet of the first client 420, but also may view a friend coupon shared by a third client that has a predetermined social relationship with the first client 420. When the user clicks the friend coupon to use, the first client 420 receives the card use trigger signal, and sends the card use request to the card server 160.

Figure 5:
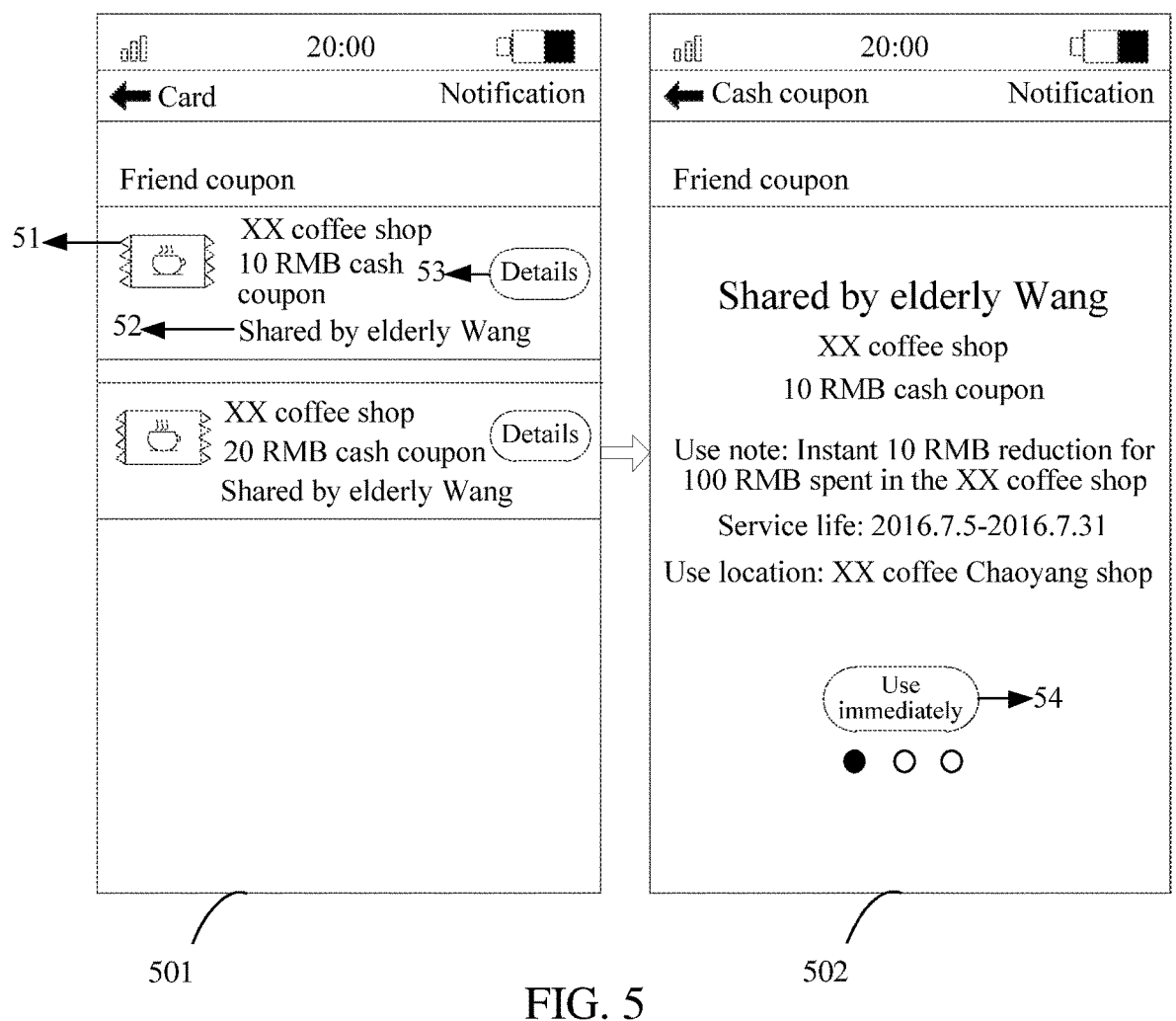
FIG. 5 is an example illustration associated with the card use method shown in FIG. 4.

For example, as shown in FIG. 5, the first client 420 displays, as shown in a first screenshot 501, a card 51 (a friend coupon) in a list form, and displays a user 52 sharing the card and a button 53 at a location corresponding to the card 51. When the user clicks the button 53, the first client 420 jumps to display, as shown in a second screenshot 502, details about the card 51. In addition, the first client 420 provides a use entry (a button 54) of the card 51, and when the user clicks the button 54, the first client 420 receives a card use trigger signal, and sends a card use request to the card server 160.

Step 402: The first client 420 displays payment code, where the payment code includes a first resource account number corresponding to the first client 420.

Step 403: A second client 425 obtains the payment code displayed by the first client 420.

Step 404: The second client 425 sends a payment request to a payment server 180 according to the payment code, where the payment request is used for requesting to transfer a first quantity of resources in a first resource account number to a second resource account number corresponding to the second client 425.

An implementation of step 402 to step 404 is similar to that of step 202 to step 204 of the example method shown in FIG. 2.

Step 405: The card server 160 receives the card use request sent by the first client 420.

After receiving the card use request sent by the first client 420, the card server 160 further obtains the card information of the card, and detects, according to the card information, whether the card is locked. If detecting that the card is locked, the card server 160 sends an indication to the first client 425, to remind the first client 425 that the friend coupon is being used by another person; or if detecting that the card is not locked, the example method proceeds to step 406.

In an implementation, for a locked card, the card server 160 marks the card by using a predetermined identifier, and after receiving a card use request, the card server detects whether the card includes the predetermined identifier. If the card includes the predetermined identifier, the card server 160 determines that the card is locked; or if the card does not include the predetermined identifier, the card server 160 determines that the card is not locked.

Step 406: The card server 160 associates the card with the first client 420 according to a client identifier of the first client 420 in the card use request.

When sending the card use request, the first client 420 adds the client identifier of the first client 420 to the request, and correspondingly, after receiving the card use request, the card server 160 may obtain the client identifier. Further, the card server 160 establishes an association relationship between the card and the first client 160 according to the client identifier and the card information.

Step 407: The card server 160 locks the card.

In order to prevent another client from using the card while the card is being processed, the card server 160 locks the card when establishing the association relationship between the first client 425 and the card, where the locked card cannot be associated with another client. For example, the card server 160 may mark a card by using a predetermined identifier, to lock the card.

Step 408: The payment server 180 obtains the client identifier of the first client 420 included in the payment request.

In a possible scenario, if churn of network exists when the first client sends a card use request (that is, the card use request is not correctly sent to the card server), the card server 160 may not be able to establish the association relationship between the card and the first client 420, and consequently the payment server 180 cannot perform resource reduction according to the card. To prevent a problem that normal deduction is not performed due to the churn of network when a user uses a card, after receiving a payment request, the payment server 180 further determines whether the first client 420 has an available friend coupon. In some embodiments, after receiving a payment request sent by the second client 425, the payment server obtains the client identifier of the first client 420 carried in the payment request.

Step 409: The payment server 180 sends an inquiry request to the card server 160 according to the client identifier, where the inquiry request is used for inquiring whether there is a card associated with the first client 420.

The payment server 180 sends the inquiry request to the card server 160 according to the client identifier. Correspondingly, after receiving the inquiry request, the card server 160 searches, according to the client identifier, for the card associated with the first client 420, and if finding the card associated with the first client 420, the method proceeds to step 410; or if not finding the card associated with the first client 420, returns a corresponding indication to the second client 425 (or the first client 420), to notify that there is no available friend coupon.

By using an active inquiry mechanism of the payment server 180, the first client 420 or the second client 425 can learn in time when the churn of network causes the card server 160 to fail to establish the association relationship between the card and the first client 160, and send a card use request again, thereby preventing a problem that the card is used but the normal deduction is not performed.

Step 410: When detecting that there is the card associated with the first client 420, the card server 160 validates the card according to the card information.

Step 411: When the card is successfully validated, the card server 160 sends a confirmation indication to the payment server 180, where the confirmation indication includes a resource deduction quantity corresponding to the card.

Step 412: When receiving the confirmation indication, the payment server 180 calculates a second quantity according to the first quantity and the resource deduction quantity.

Step 413: The payment server 180 transfers the second quantity of resources in the first resource account number to the second resource account number.

An implementation of step 410 to step 413 is similar to that of step 206 to step 209. Details are not described herein again in this embodiment.

In summary, according to a card use method provided in this embodiment, a first client sends a card use request to a card server, and displays payment code, and a second client obtains the payment code and sends a payment request to a payment server; the card server validates a card according to card information included in the card use request, and after the card is successfully validated, sends a resource deduction quantity corresponding to the card to the payment server, so that the payment server calculates, according to a first quantity in the payment request and the resource deduction quantity, a quantity of resources actually transferred, thereby completing resource transfer between the first client and the second client, resolving a problem that, in a process of using a card, a user needs to successively show the card and payment quick response code, and consequently a use process is complex and payment efficiency is relatively low. Therefore, by using a data exchange channel between the card server and the payment server, card information transmission is performed, and a card validation and payment procedure is completed, so that in the process of using the card, the user does not need to show the card, and needs only to show payment code, thereby simplifying a card use procedure, and increasing payment efficiency.

In some embodiments, when receiving the card use request sent by the first client, the card server associates the card with the first client, and locks the card, thereby preventing a same card from being repeatedly used at a same moment.

Figure 6:
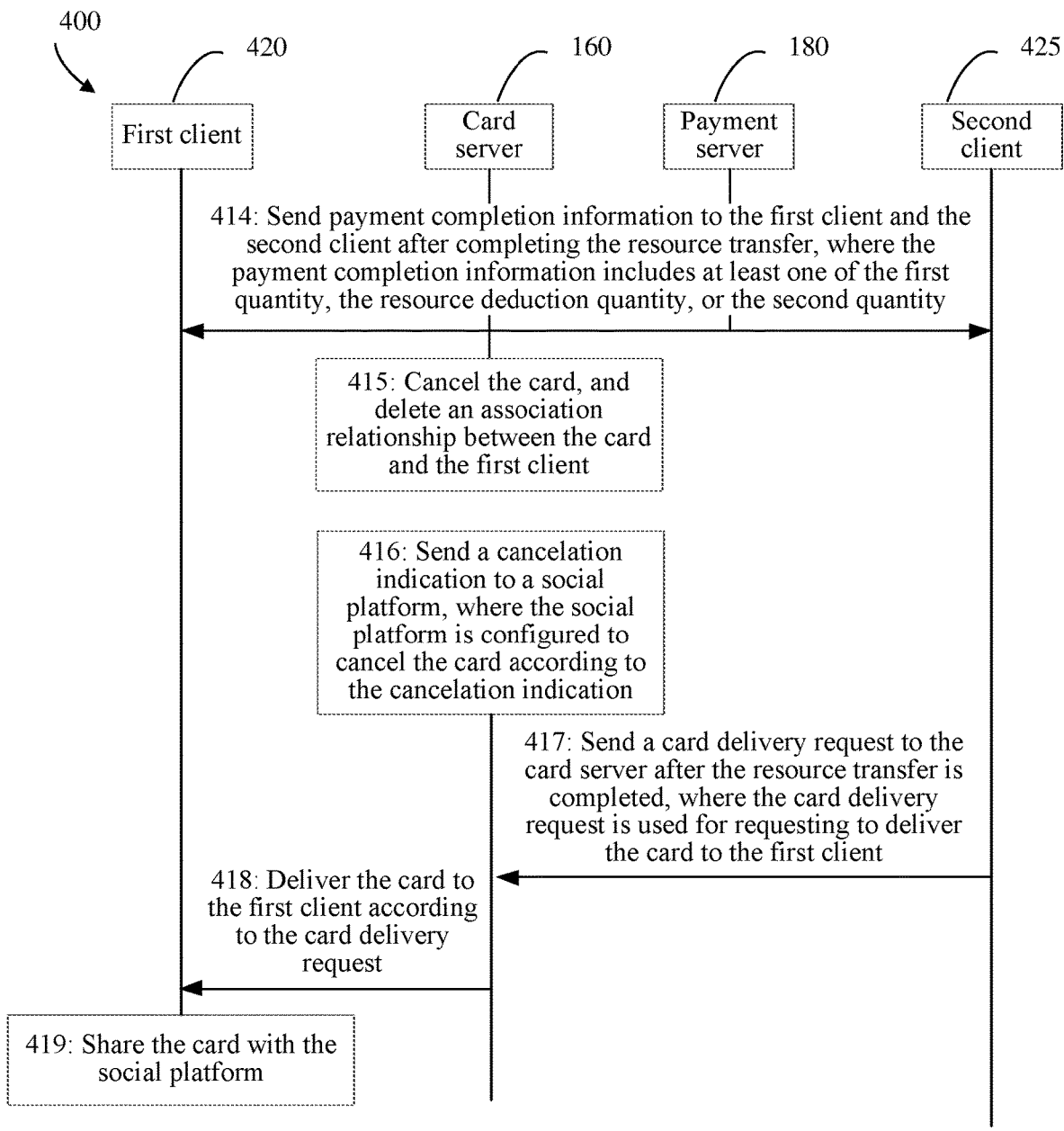
FIG. 6 is a flowchart of a card use method according to still another example embodiment.

In some embodiments, the example method shown in FIG. 4 may include additional steps beyond step 413, and as shown in FIG. 6, the example method may further include the following steps:

Step 414: The payment server 180 sends payment completion information to the first client 420 and the second client 425 after completing the resource transfer, where the payment completion information includes at least one of the first quantity, the resource deduction quantity, or the second quantity.

To enable a user and a merchant to learn a payment status, after the resource transfer is completed, the card server sends the payment completion information including the first quantity (an actual consumption amount), the resource deduction quantity (a deduction amount), and the second quantity (an actual payment amount) to the first client and the second client.

Figure 7:
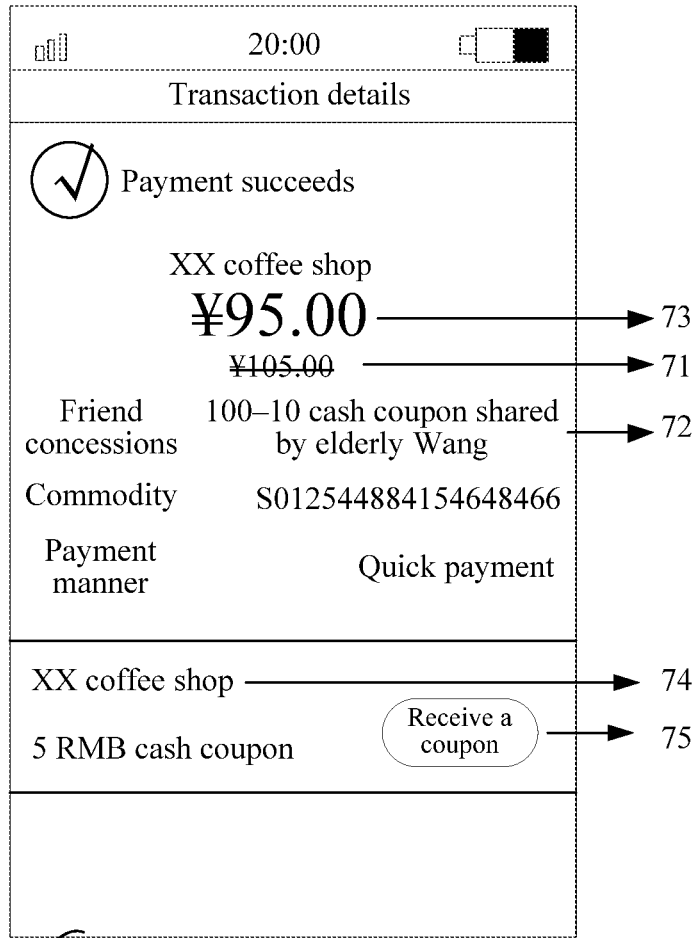
FIG. 7 is an example illustration associated with the card use method shown in FIG. 6.

In FIG. 7, the first client 420 displays, as shown in screenshot 701, the payment completion information sent by the payment server 180, where the payment completion information includes the actual consumption amount 71, the deduction amount 72, and the actual payment amount 73.

Step 415: The card server 160 cancels the card, and deletes an association relationship between the card and the first client 420.

Cancellation refers to a process in which availability of a card is validated according to a use restrictive condition of the card, and the card is removed after the validation is completed. The use restrictive condition includes but is not limited to: at least one of a use location, a service life, or a use category range.

In some embodiments, the card may be used only once, and therefore, after the resource transfer is completed (the card is already used in this case), the card server 160 cancels the card, marks the card as used (that is, the card cannot be used again), and deletes the association relationship between the first client 420 and the card in step 406. It should be noted that, in step 410, the card server 160 already validates the card, and therefore, the cancellation that is referred to in this step 410 relates only to the removal of the card.

In some embodiments, after completing the resource transfer, the payment server 180 sends a cancellation instruction to the card server 160, and the card server 160 cancels the card according to the cancellation instruction.

Step 416: The card server 160 sends a cancellation indication to a social platform, where the social platform is configured to cancel the card according to the cancellation indication.

If Step 416 is performed in parallel to step 415, the card server 160 sends the cancellation indication to the social platform, to instruct the social platform to cancel the card, where the cancellation indication carries unique code of the card. After receiving the cancellation indication, the social platform deletes the card, and another client having a predetermined social relationship with the third client cannot view and use the card.

In some embodiments, after completing the resource transfer, the payment server 180 provides corresponding payment completion information to the first client 420 and the second client 425, for the first client 420 and the second client 425 to display, so that the user and the merchant can more intuitively learn a consumption and payment status.

In some embodiments, after the resource transfer is completed, the card server 160 cancels the card, and sends the cancellation indication to the social platform, so that the social platform can delete the used card according to the cancellation indication, thereby preventing repeated use of the card.

To achieve an effect of promoting the merchant, after payment is completed, the second client 425 may present a card as a gift to the first client 420. After receiving the card, the first client 420 may share the card with the social platform, for a friend to use, thereby achieving the promotion effect.

Referring back to FIG. 4 and FIG. 6, the example method further includes the following steps:

Step 417: The second client 425 sends a card delivery request to the card server 160 after the resource transfer is completed, where the card delivery request is used for requesting to deliver the card to the first client 420.

In some embodiments, after receiving the payment completion information sent by the payment server 180, the second client 425 may send the card delivery request to the card server 160, to request the card server 160 to deliver the card, where the card delivery request includes the client identifier of the first client 420.

Step 418: The card server 160 delivers the card to the first client according to the card delivery request.

Correspondingly, the card server 160 delivers the card to the first client 420 according to the client identifier carried in the card delivery request.

Step 419: The first client 420 shares the card with the social platform.

As shown in FIG. 7, when displaying the payment completion information, the first client 420 displays, as shown in screenshot 701, a card 74 delivered by the card server 160, and when receiving a button 75, the user may receive the card, and may further share the card with the social platform, so that another client having a social relationship with the first client can view and use the card in a friend coupon.

It should be noted that, in some embodiments, the steps of the example method performed by the card server, as discussed above, may be implemented as a card use method on a card server side, the steps performed by the payment server may be implemented as a card use method on a payment server side, the steps performed by the first client may be implemented as a card use method on a first client side, and the steps performed by the second client may be implemented as a card use method on a second client side. Details are not described herein again in this embodiment.

Figure 8:
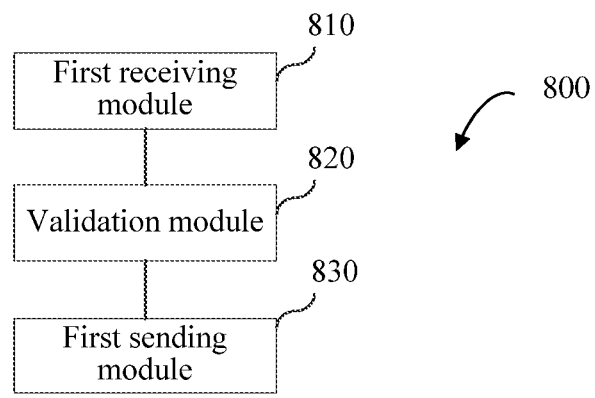
FIG. 8 is a structural block diagram of a card use apparatus according to an example embodiment.

FIG. 8 is a structural block diagram of an example card use apparatus 800 according to certain aspects of the present disclosure. In some embodiments, the example card use apparatus 800 shown in FIG. 8 may be implemented as a part of the card server 160 shown in FIG. 1 by using a dedicated hardware circuit or a combination of software and hardware. As shown in FIG. 8, the example apparatus 800 may include a first receiving module 810, configured to receive a card use request sent by a first client. The card use request may include card information of a card. The example apparatus 800 may include a validation module 820, configured to validate the card according to the card information, and a first sending module 830, configured to when the card is successfully validated, send a confirmation indication to a payment server, the confirmation indication including a resource deduction quantity corresponding to the card. The payment server may be configured to when receiving the confirmation indication, calculate a second quantity according to a first quantity and the resource deduction quantity, and transfer the second quantity of resources in a first resource account number corresponding to the first client to a second resource account number corresponding to a second client. The first quantity may be sent by the second client to the payment server after obtaining payment code displayed by the first client. The payment code may include the first resource account number.

In summary, according to a card use apparatus provided in this embodiment, a first client sends a card use request to a card server, and displays payment code, and a second client obtains the payment code and sends a payment request to a payment server; the card server validates a card according to card information included in the card use request, and after the card is successfully validated, sends a resource deduction quantity corresponding to the card to the payment server, so that the payment server calculates, according to a first quantity in the payment request and the resource deduction quantity, a quantity of resources actually transferred, thereby completing resource transfer between the first client and the second client, resolving a problem that, in a process of using a card, a user needs to successively show the card and payment quick response code, and consequently a use process is complex and payment efficiency is relatively low. Therefore, by using a data exchange channel between the card server and the payment server, card information transmission is performed, and a card validation and payment procedure is completed, so that in the process of using the card, the user does not need to show the card, and needs only to show payment code, thereby simplifying a card use procedure, and increasing payment efficiency.

In some embodiments, the card may be a card shared with a social platform by a third client having a predetermined social relationship with the first client. In some embodiments, the card may be used only once. In such embodiments, the apparatus includes an association module, configured to associate the card with the first client according to a client identifier of the first client in the card use request, a lock module, configured to lock the card, where the locked card cannot be associated with another client, a second receiving module, configured to receive an inquiry request sent by the payment server, where the inquiry request is used for inquiring whether there is a card associated with the first client, and the validation module may be further configured to when detecting that there is the card associated with the first client, perform the step of validating the card according to the card information.

In some embodiments, the card use apparatus may include a cancellation module, configured to cancel the card, and delete an association relationship between the card and the first client, and a second sending module, configured to send a cancellation indication to the social platform. In some embodiments, the social platform may be configured to cancel the card according to the cancellation indication.

In some embodiments, the card use apparatus may include a third receiving module, configured to receive a card delivery request sent by the second client, where the card delivery request is used for requesting to deliver the card to the first client, and a delivery module, configured to deliver the card to the first client according to the card delivery request, where the first client is configured to share the card with the social platform.

Figure 9:
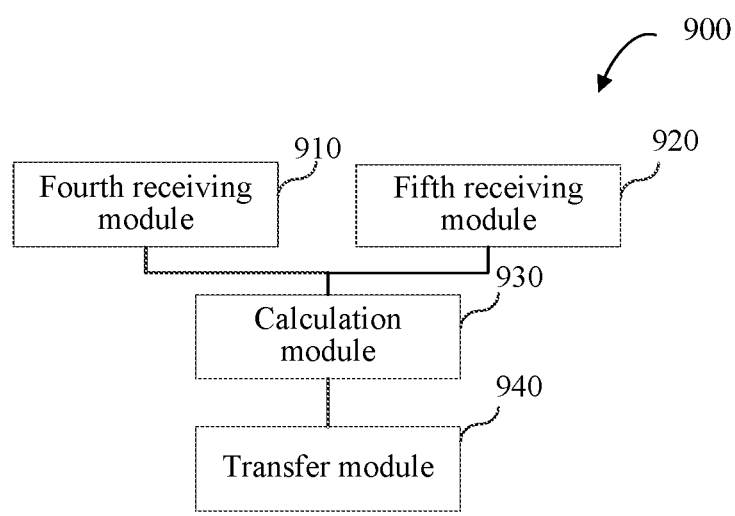
FIG. 9 is a structural block diagram of a card use apparatus according to an example embodiment.

FIG. 9 is a structural block diagram of a card use apparatus 900 according to certain aspects of the present disclosure. The card use apparatus 900 shown in FIG. 9 may be implemented as an entirety or a part of the payment server 180 shown in FIG. 1 by using a dedicated hardware circuit or a combination of software and hardware. As shown in FIG. 9, an example apparatus 900 may also include a fourth receiving module 910, configured to receive a payment request sent by a second client. The payment request may be a request for transferring a first quantity of resources in a first resource account number to a second resource account number, the first resource account number being a resource account number corresponding to a first client, and the second resource account number being a resource account number corresponding to the second client. As also shown in FIG. 9, an example apparatus 900 may include a fifth receiving module 920, configured to receive a confirmation indication sent by a card server. In some embodiments, the confirmation indication may be sent by the card server after validating card information included in a card use request sent by the first client. In some embodiments, the confirmation indication including a resource deduction quantity corresponding to a card. As shown in FIG. 9, an example apparatus 900 may include a calculation module 930, configured to calculate a second quantity according to the first quantity and the resource deduction quantity. The example apparatus 900 may also include a transfer module 940, configured to transfer the second quantity of resources in the first resource account number to the second resource account number. In some embodiments, the payment request may be sent by the second client after obtaining payment code displayed by the first client. The payment code may be displayed by the first client when receiving a card use trigger signal. The payment code may include the first resource account number.

In some embodiments, the card is a card shared with a social platform by a third client having a predetermined social relationship with the first client, and the card can be used once the apparatus may include an obtaining module, configured to obtain a client identifier that is of the first client and that is included in the payment request a third sending module, configured to send an inquiry request to the card server according to the client identifier, where the inquiry request is used for inquiring whether there is a card associated with the first client. In some embodiments, the card server may be configured to: when detecting that there is the card associated with the first client, validate the card.

In some embodiments, the card server is further configured to associate the card with the first client according to a client identifier of the first client in the card use request, and lock the card, where the locked card cannot be associated with another client.

In some embodiments, the apparatus may include:

a fourth sending module, configured to send payment completion information to the first client and the second client, where the payment completion information includes at least one of the first quantity, the resource deduction quantity, or the second quantity.

It should be noted that division of the foregoing functional modules is only described for exemplary purposes when the card use apparatus provided in the foregoing embodiment cancels a card. In an actual application, the foregoing functions may be allocated to be accomplished by different functional modules according to requirements, that is, the internal structure of the device is divided into different functional modules, to accomplish all or a part of functions of the above described functions. In addition, the card use apparatus provided in the foregoing embodiments and the embodiments of the card use methods belong to one concept. For specific implementation procedures, refer to the method embodiments, and details are not described herein again.

Figure 10:
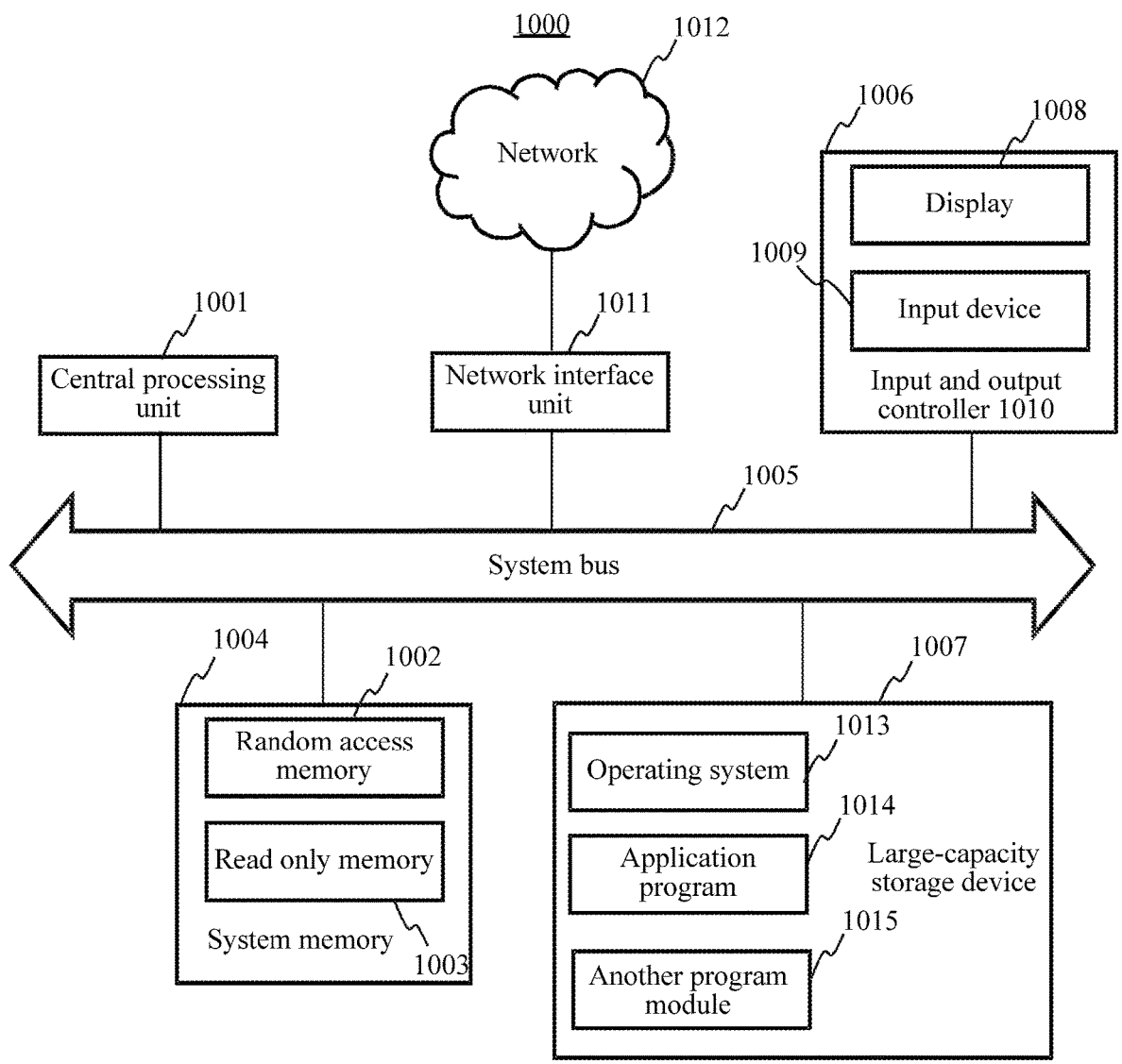
FIG. 10 is a structural block diagram of a server according to an example embodiment.

Referring to FIG. 10, FIG. 10 is a structural block diagram of a server according to certain aspects of the present disclosure. The server 1000 is implemented as the card server 160 or the payment server 180 shown in FIG. 1. Specifically the server 1000 includes a central processing unit (CPU) 1001, a system memory 1004 including a random access memory (RAM) 1002 and a read only memory (ROM) 1003, and a system bus 1005 connecting the system memory 1004 and the CPU 1001; the server 1000 further includes a basic input/output system (I/O system) 1006 assisting in transmitting information between devices in a computer, and a large-capacity storage device 1007 configured to store an operating system 1013, an application program 1014 and another program module 1015.

The basic I/O system 1006 includes a display 1008 configured to display information and an input device 1009, such as a mouse or a keyboard, configured to input information for a user. The display 1008 and the input device 1009 are both connected to the CPU 1001 by using an input and output controller 1010 connected to the system bus 1005. The basic I/O system 1006 may further include the input and output controller 1010 to be configured to receive and process inputs from multiple other devices such as a keyboard, a mouse, and an electronic stylus. Similarly, the input and output controller 1010 further provides an output to a display screen, a printer or another type of output device.

The large-capacity storage device 1007 is connected to the CPU 1001 by using a large-capacity storage controller (not shown) connected to the system bus 1005. The large-capacity storage device 1007 and its associated computer readable medium provide non-volatile storage for the server 1000. That is, the large-capacity storage device 1007 may include the computer readable medium (not shown) such as a hard disk or a CD-ROM driver.

Without a loss of generality, the computer readable medium may include a computer storage medium and a communications medium. The computer storage medium includes volatile and non-volatile media, and removable and non-removable media implemented by using any method or technology used for storing information such as a computer readable instruction, a data structure, a program module or other data. The computer storage medium includes a RAM, a ROM, an EPROM, an EEPROM, a flash memory or other solid storage technologies; a CD-ROM, a DVD or other optical storages; and a cassette, a magnetic tape, a disk storage or other magnetic storage devices. Certainly, persons skilled in art can learn that the computer storage medium is not limited to the foregoing several types. The system memory 1004 and the large-capacity storage device 1007 may be collectively referred to as a memory.

According to various embodiments of the present invention, the server 1000 may further be connected, by using a network such as the Internet, to a remote computer on the network and run. That is, the server 1000 may be connected to a network 1012 by using a network interface unit 1011 connected to the system bus 1005, or may alternatively be connected to another type of network or remote computer system (not shown) by using the network interface unit 1011.

The memory further includes one or more programs. The one or more programs are stored in the memory. The one or more programs include instructions used for performing the card use method that is on a side of the card server or the payment server and that is provided in the embodiments according to certain aspects of the disclosure.

In an exemplary embodiment, a computer readable storage medium is further provided. The storage medium stores at least one instruction. The instruction is loaded and executed by a processor to implement the card use method on a side of the card server or the payment server. For example, the non-transitory computer readable storage medium may be a ROM, a RAM, a CD-ROM, a magnetic tape, a floppy disk, or an optical data storage device.

The sequence numbers of the preceding embodiments according to certain aspects of the disclosure are merely for description purpose but do not indicate any preference of the embodiments.

A person of ordinary skill in the art may understand that all or some of the steps of the foregoing embodiments may be implemented by using hardware, or may be implemented by a program instructing relevant hardware. The program may be stored in a computer readable storage medium. The storage medium may be a read-only memory, a magnetic disk, an optical disc, or the like.

The foregoing descriptions are merely preferred embodiments according to certain aspects of the present disclosure, but are not intended to limit the present disclosure. Any modification, equivalent replacement, or improvement made within the spirit and principle of the present disclosure shall fall within the protection scope of the present disclosure.

What is claimed is:

1. A card use system comprising: a first client, a second client, a card server, and a payment server,
   the first client being configured to:
   display an interface of a social platform, including a display item corresponding to a card shared on the social platform by a third client having a predetermined social relationship with the first client, receive a card use trigger signal at the first client via the display item corresponding to the card in the interface, and send a card use request to the card server in response to the card use trigger signal, the card use request including card information of the card, wherein the card is issued by a merchant to be used in completing a transaction for a service or a product provided by the merchant, and
   display a payment code on the first client, the payment code including a first resource account number corresponding to the first client and not including the card information;
   the second client being configured to obtain the payment code displayed on the first client, and send a payment request to the payment server according to the obtained payment code, the payment request being a request to transfer a first quantity of resources from the first resource account number corresponding to the first client to a second resource account number corresponding to the second client, wherein the resources have a value according to one or more currency types, wherein the card information is not provided to the second client;
   the card server being configured to validate the card according to the card information included in the card use request received from the first client, and in response to successfully validating the card, send a confirmation indication to the payment server, the confirmation indication including a resource deduction quantity, wherein the resource deduction quantity indicates a quantity of a first resource to be deducted from a payment amount corresponding to the card, in order to complete the transaction; and
   the payment server being configured to, in response to receiving the confirmation indication from the card server at the payment server, calculate a second quantity of resources based on the first quantity of resources and the resource deduction quantity, and transfer the second quantity of resources in the first resource account number corresponding to the first client to the second resource account number corresponding to the second client to complete the transaction,
   the second client being further configured to send a card delivery request to the card server, after a resource transfer is completed, requesting delivery of the card to the first client;
   the card server being further configured to deliver the card to the first client according to the card delivery request; and
   the first client being further configured to share the card on the social platform.

2. The system according to claim 1, wherein the card can be used once,
   the card server is further configured to associate the card with the first client according to a client identifier of the first client in the card use request, and lock the card, wherein the locked card cannot be associated with a different client,
   the payment server is further configured to obtain the client identifier of the first client and that is included in the payment request, and send an inquiry request to the card server according to the client identifier, the inquiry request inquiring whether there is a card associated with the first client, and
   the card server is further configured to, in response to detecting that there is the card associated with the first client, validate the card according to the card information.

3. The system according to claim 2, wherein the card server is further configured to cancel the card, delete an association relationship between the card and the first client, and send a cancellation indication to the social platform, wherein the social platform is configured to cancel the card according to the cancellation indication.

4. The system according to claim 3, wherein
   the payment server is further configured to send payment completion information to the first client and the second client after completing the resource transfer, wherein the payment completion information includes at least one of the first quantity of resources, the resource deduction quantity, or the second quantity of resources.

5. A card use method comprising:
   receiving, by a card server, a card use request from a first client, the first client being configured display an interface of a social platform, including a display item corresponding to a card shared on the social platform by a third client having a predetermined social relationship with the first client, and configured to receive a card use trigger signal at the first client via the display item corresponding to the card in the interface, the card use request including card information of the card, wherein the card is issued by a merchant to be used in completing a transaction for a service or a product provided by the merchant;
   validating, by the card server, the card according to the card information included in the card use request received from the first client; and
   in response to successfully validating the card, sending, by the card server, a confirmation indication to a payment server, the confirmation indication including a resource deduction quantity, wherein the resource deduction quantity indicates a quantity of a first resource to be deducted from a payment amount corresponding to the card, in order to complete the transaction,
   wherein in response to receiving the confirmation indication from the card server and receiving a payment request from a second client, a second quantity of resources is calculated at the payment server based on a first quantity of resources and the resource deduction quantity and transfer the second quantity of resources in a first resource account number corresponding to the first client to a second resource account number corresponding to the second client to complete the transaction, wherein the resources have a value according to one or more currency types, wherein the card information is not provided to the second client, wherein the payment request including the first quantity is sent by the second client to the payment server upon obtaining payment code displayed by the first client, the payment code including the first resource account number corresponding to the first client and not including the card information, wherein the method further comprises:
receiving, from the second client by the card server, a card delivery request, after a resource transfer is completed, requesting delivery of the card to the first client;
delivering the card to the first client according to the card delivery request such that the card is shared by the first client on the social platform.

6. The method according to claim 5, wherein the card can be used once, and
the method further comprises:
associating the card with the first client according to a client identifier of the first client in the card use request;
locking the card, wherein the locked card cannot be associated with another client; and
receiving an inquiry request sent by the payment server inquiring whether there is a card associated with the first client; and in response to the inquiry request indicating that there is the card associated with the first client, validating the card according to the card information.

7. The method according to claim 6, further comprising:
in response to sending the confirmation indication to the payment server, cancelling the card, deleting an association relationship between the card and the first client, and sending a cancellation indication to the social platform, wherein the social platform is configured to cancel the card according to the cancellation indication.

8. A card use method comprising:
receiving, from a second client by a payment server, a payment request to transfer a first quantity of resources in a first resource account number corresponding to a first client to a second resource account number corresponding to the second client, wherein the resources have a value according to one or more currency types;
receiving, from a card server by the payment server, a confirmation indication that includes a resource deduction quantity corresponding to a card, wherein the confirmation indication is received from the card server, in response to the card server validating card information comprised in a card use request received by the card server from the first client, the first client being configured display an interface of a social platform, including a display item corresponding to the card shared on the social platform by a third client having a predetermined social relationship with the first client, and configured to receive a card use trigger signal at the first client via the display item corresponding to the card in the interface, wherein the card is issued by a merchant to be used in completing a transaction for a service or a product provided by the merchant, and the card information is not provided to the second client;

calculating, by the payment server, a second quantity of resources based on the first quantity of resources and the resource deduction quantity; and
transferring, by the payment server, the second quantity of resources in the first resource account number corresponding to the first client to the second resource account number corresponding to the second client,
wherein the payment request is transmitted by the second client to the first client in response to obtaining payment code displayed by the first client, and the payment code is displayed by the first client in response to receiving the card use trigger signal, the payment code including the first resource account number corresponding to the first client and not including the card information,
wherein after a resource transfer is completed, a card delivery request requesting delivery of the card to the first client is received from the second client at the card server, and the card is delivered to the first client according to the card delivery request such that the card is shared by the first client on the social platform.

9. The method according to claim 8, wherein the card can be used once, and the method further comprises:
obtaining, from the payment request, a client identifier of the first client; and
sending an inquiry request to the card server according to the obtained client identifier of the first client, to determine whether there is a card associated with the first client, wherein the card server is configured to, in response to determining that there is the card associated with the first client, validate the card, and associate the card with the first client according to the client identifier of the first client in the card use request, and lock the card, wherein the locked card cannot be associated with another client.

10. The method according to claim 9, further comprising, in response to transferring the second quantity of resources in the first resource account number corresponding to the first client to the second resource account number corresponding to the second client, sending payment completion information to the first client and the second client, wherein the payment completion information includes at least one of the first quantity of resources, the resource deduction quantity, and the second quantity of resources.

11. A card use apparatus comprising:
at least one memory configured to store computer program code; and
at least one processor configured to access said at least one memory and operate according to said computer program code, said computer program code configured to cause the at least one of said at least one processor to execute the method of claim 5.

12. The apparatus according to claim 11, wherein the card can be used once, and
said computer program code is further configured to cause the at least one of said at least one processor to:
associate the card with the first client according to a client identifier of the first client in the card use request;
lock the card, wherein the locked card cannot be associated with another client;
receive an inquiry request sent by the payment server requesting a determination of whether there is a card associated with the first client; and
in response to determining that there is the card associated with the first client, validate the card according to the card information.

13. The apparatus according to claim 12, wherein said computer program code is further configured to cause the at least one of said at least one processor to:
- cancel the card, and delete an association relationship between the card and the first client; and
- send a cancellation indication to the social platform, wherein the social platform is configured to cancel the card according to the cancellation indication.

14. A card use apparatus, the apparatus comprising:
- at least one memory configured to store computer program code; and
- at least one processor configured to access said at least one memory and operate according to said computer program code, said computer program code configured to cause the at least one of said at least one processor to execute the method of claim 8.

15. The apparatus according to claim 14, wherein the card can be used once, and wherein said computer program code is further configured to cause the at least one of said at least one processor to: obtain a client identifier of the first client and included in the payment request; and send an inquiry request to the card server according to the client identifier of the first client, inquiring whether there is a card associated with the first client, and the card server is configured to validate the card in response to determining that there is the card associated with the first client, wherein the card server is further configured to: associate the card with the first client according to the client identifier of the first client in the card use request, and lock the card, wherein the locked card cannot be associated with another client.

16. The apparatus according to claim 15,
wherein said computer program code is further configured to cause the at least one of said at least one processor to:
send payment completion information to the first client and the second client, wherein the payment completion information comprises at least one of the first quantity, the resource deduction quantity, or the second quantity.

* * * * *